Sept. 4, 1945.  W. H. EDMONDSON  2,384,418
CLUTCH MECHANISM
Filed June 21, 1941  2 Sheets-Sheet 1
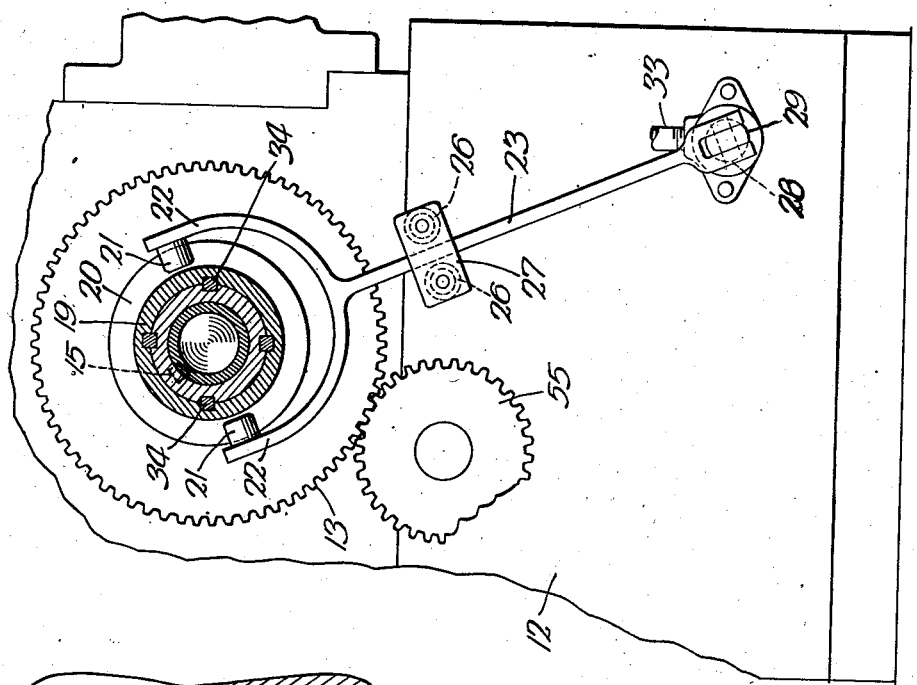
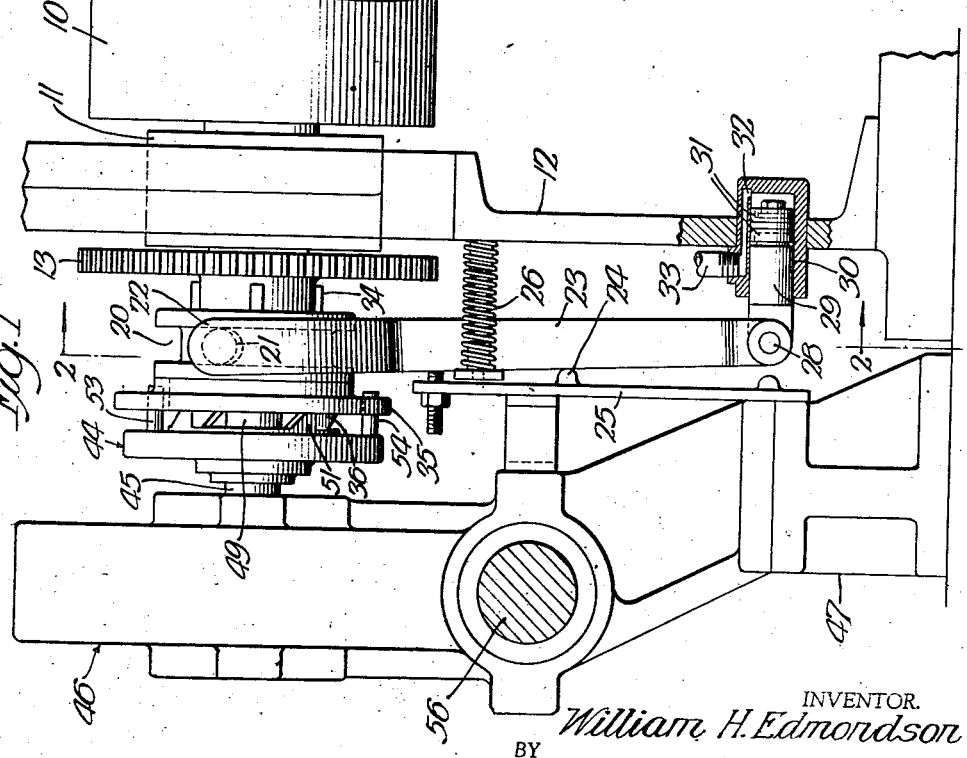
INVENTOR.
William H. Edmondson
BY
Soans, Pond & Anderson
ATTYS Sept. 4, 1945.  W. H. EDMONDSON  2,384,418
CLUTCH MECHANISM
Filed June 21, 1941 2 Sheets-Sheet 2
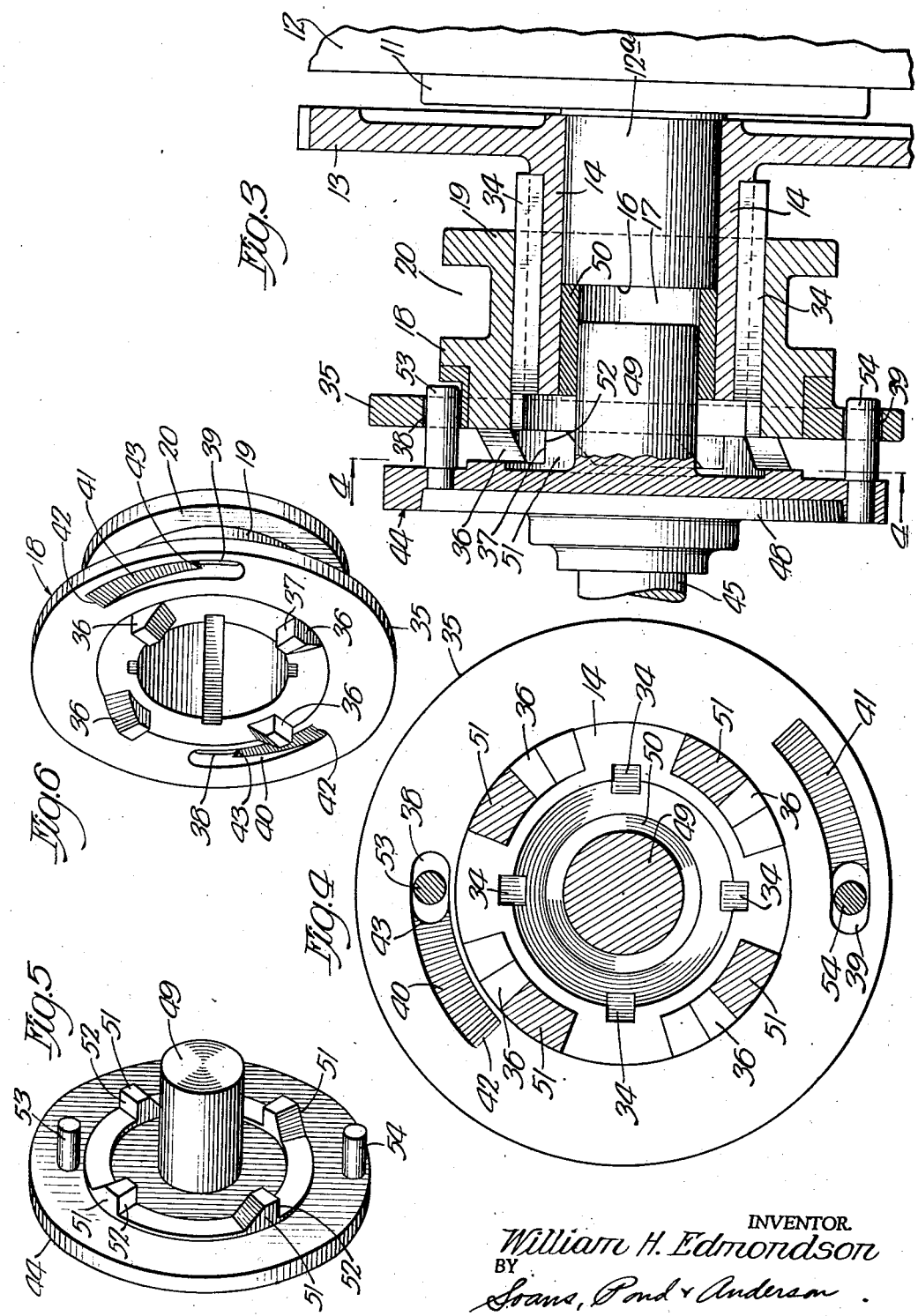
INVENTOR.
William H. Edmondson
BY
Evans, Pond & Anderson
ATTYS.

Patented Sept. 4, 1945

2,384,418

UNITED STATES PATENT OFFICE 2,384,418

CLUTCH MECHANISM

William H. Edmondson, Oak Park, Ill., assignor to United Biscuit Company of America, a corporation of Delaware Application June 21, 1941, Serial No. 399,104

2 Claims. (Cl. 192—67)

This invention relates to clutch mechanism and it is particularly concerned with an improved, single position clutch mechanism, i. e., one in which the clutch parts are engageable only when the drive and driven parts of the clutch are disposed in a predetermined rotary relationship.

The invention is also more particularly concerned with a single position clutch wherein the driven element may be maintained continuously in rotation by auxiliary driving means when the clutch is disengaged.

The principal objects of the invention are to provide a relatively simple but efficient and positive single position clutch of the character indicated; to provide such a clutch which will operate with a quick but nevertheless smooth action and in which possible back lash movement between the driving and driven elements is effectively controlled; and in general it is the object of the invention to provide an improved clutch structure of the character indicated.

Other objects and advantages of the invention will be understood by reference to the following specification and accompanying drawings (2 sheets) wherein there is disclosed a clutch structure embodying a selected form of the invention.

In the drawings:

Fig. 1 is a side elevation;

Fig. 2 is a section on the line 2—2 of Fig. 1;

Fig. 3 is a section on a plane passing through the axis of the clutch structure;

Fig. 4 is a section on the line 4—4 of Fig. 3; and

Figs. 5 and 6 are, respectively, illustrations of the main or drive and driven parts of the clutch structure.

In the present instance, the clutch structure is illustrated in association with an intaglio printing roll designated 10, the same being suitably journalled at its opposite ends in bearings such as indicated at 11 which are suitably mounted in a side frame element 12. It will be understood that the clutch structure is not limited in its application to association with printing mechanism and that the present reference to printing mechanism is merely for illustrative purposes.

The printing roll 10 has a shaft portion 12a extending therefrom and said shaft portion has secured to it a gear wheel 13, the same having a hub 14 which may be keyed to the shaft 12a as indicated at 15 (Figure 2). As shown in Figure 3, the hub 14 extends beyond the end 16 of the shaft so as to provide a socket 17.

The driven clutch member is indicated in its entirety by the reference numeral 18, the same embodying a hub portion 19 which is suitably splined to the hub 14 so as to be non-rotatable but axially movable relative thereto. Said driven clutch member is formed to provide a groove or way 20 for receiving studs or rollers 21, 21 carried by the forked ends 22, 22 of a clutch operating arm 23.

The clutch operating arm 23 is fulcrumed intermediate its ends by bearing engagement against a suitably formed lug or bar 24 on a normally stationary upright frame element 25. Suitable means such as coil springs 26 are interposed between the frame side 12 and a cross plate 27 carried by the clutch operating arm 23, the said springs serving to resiliently urge the arm 23 to rock in a counterclockwise direction as viewed in Figure 1 about its fulcrum engagement with the lug 24.

The lower end of the clutch operating arm 23 is pivoted as shown at 28 to the outer end of a plunger 29 which is slidably mounted in a suitable pneumatic cylinder 30. The inner end of the plunger 29 is provided with suitable washer means such as indicated at 31 for providing sealed engagement with the cylinder wall and the inner end of the cylinder communicates through a port 32 and a pipe 33 with a source of air or liquid pressure or with an air exhausting means. The operation of the pneumatic or hydraulic cylinder 30 may, of course, be controlled by any suitably actuated valve means not herein shown.

It will be observed that by means of the plunger and cylinder structure 29—30, the clutch member 18 may be shifted axially on the hub 14. As shown in the drawings, the driven member 18 is splined to the hub 14 by means of a plurality of uniformly spaced keys and key ways indicated at 34, in this instance comprising four such keys but obviously subject to variation in accordance with the requirements of any specific installation of the clutch structure.

The hub 19 is provided with a lateral flange-like extension 35 at one end, said flange-like extension being formed either integrally with the hub or separately and mounted thereon. In this instance, the said extension is illustrated as a separate element mounted on the hub and it will be understood that it is so mounted thereon that in effect it becomes rigid with the hub 19. For this purpose the flange extension 35 may be sweated on or anchored in any other suitable manner.

The flanged end of the driven clutch member 18 is provided with a plurality, in this instance four, uniformly spaced endwise projecting, coaxially disposed teeth 36, the same being so formed as to provide abrupt abutment faces 37 adapted for driving engagement with similar teeth carried by a drive member presently to be described.

The flange part 35 of the driven member is provided with a pair of diametrically oppositely disposed arcuate openings respectively indicated at 38 and 39, these openings being respectively disposed at different distances from the axis of rotation of the clutch member. With the arcuate openings 38 and 39, there are associated, respectively, gradually deepening grooves 40 and 41. The bottoms of the grooves 40 and 41 merge at the shallow ends of the grooves as indicated at 42 with the face of the flange 35. At the deep ends of the grooves the said bottoms terminate as indicated at 43 in the end of the respective arcuate openings 38 and 39.

The driving clutch member is designated in its entirety by the reference numeral 44, the same being in the form of a disc or flange carried at one end of a shaft 45 which projects from a driving mechanism indicated in its entirety at 46. The driving mechanism 46 may be of any suitable form; it may, for example, be an electric motor, or, as here illustrated, a worm and worm wheel speed reducing drive of which the shaft 45 is the output shaft. Such driving mechanism 46 may be mounted in any suitable manner, for example, on a frame element indicated at 47.

As a practical matter, the drive member 44 may be formed independently of the shaft 45 and may be connected thereto by being bolted or otherwise secured to a suitable flange structure 48 which is rigidly secured to the end of the drive shaft 45.

The clutch disc 44 is provided with a central stub shaft element 49 which constitutes, in effect, an extension of the shaft 45. Said stub shaft 49 projects into the socket 17 and is journalled in said hub 14, a suitable bearing bushing 50 being provided in said hub for receiving said shaft extension 49.

The clutch member 44 is further provided with a plurality, in this instance four, of concentrically disposed, endwise projecting teeth 51 which have abrupt faces 52 adapted to engage the abrupt faces 37 of the teeth of the driven clutch member. A pair of pins 53 and 54, respectively, also project endwise from the flange 44, the same being respectively spaced different distances from the axis of rotation of the clutch structure which correspond to the spacing of the openings 38 and 39 from said axis so that the pins 53 and 54 are respectively adapted to enter the openings 38 and 39 in the driven clutch member.

In the operation of the clutch structure, when it is desired to disengage the clutch, the shiftable clutch member 18 is moved axially away from the driving member 44 so as to effect disengagement of the teeth 36 and 51. As an incident to such operation of the clutch members, the pins 53 and 54 will be withdrawn from the openings 38 and 39, so that the clutch member 44 may continue to rotate at its normal driving speed wholly independently of the driven clutch member 35. When the clutch members are thus separated, the clutch member 18 may nevertheless continue to rotate at any desired speed of rotation, usually a reduced speed, incident to the auxiliary or supplemental drive effected through the gear 13.

Supplemental driving of the gear 13 and, in this instance, of the printing cylinder 10 to which the gear is connected, is desirable in intaglio printing equipment in that it keeps the printing roll in movement through the usual ink supply so that there is no opportunity for ink to dry on the surface of the roll. This is of considerable importance in the economic operation of large printing presses where it sometimes becomes necessary to stop the printing operation for short intervals for adjustment or other purposes. It will be understood that there is thus obviated the necessity of an otherwise difficult roll cleaning operation preliminary to again starting the printing machine. The means for driving the gear 13 may include a gear 55 (see Figure 2) meshing with the gear 13 and itself driven by gear or other connections to any suitable source of power.

When it is desired to re-engage the clutch structure, the shiftable member 18 is moved toward the driving member 44 by the action of the springs 26 and the pump cylinder 30. The pins 53 and 54 are of such length that their free ends come into engagement with the adjacent face of the flange 35 of the shiftable clutch member to prevent interengagement of the teeth 36 and 51 until such time as the pins enter the respective openings 38 and 39. It will be remembered that because of the different distances of the pins 53 and 54 from the axis of the shaft 49, each pin must enter its own opening 38 and 39, respectively, so that when the said pins do enter the said openings the driving and driven clutch members will always be in the same relative rotary position and each tooth 36 will be engaged always by the same tooth 52. By this arrangement the driven clutch member 18 and the parts connected thereto including, in this instance, the printing roll 11, will, when driven by the driving member 44, always be in the same relationship to the driving clutch member 44 and the driving shaft 45.

An important but not the sole use of the described single position clutch structure is in connection with a multi-color printing press in which two or more printing units must be so related to each other that the printing effected by each will register properly with the printing effected by the other. It will be observed that if two or more such printing units are connected to a single driving source by means of single position clutches such as herein disclosed, the operation of each of the printing units may be temporarily stopped independently of the operation of the others and started up again immediately in proper register with the other units.

It will be understood that in the event that there are a series of printing units, they are driven from a common main shaft which may be typified by the main shaft 56 of the worm and worm wheel driving unit 46, and that the driving shaft such as 45 of a series of such drive units 46 will at all times maintain a constant relationship to each other and to the main shaft 56.

Another typical use of the described single position clutch structure is for effecting proper registration of a printing unit with a cutting mechanism by which a printed web is cut into separate sheets each embodying one unit of the printing material. The described single position clutch structure may be employed so as to permit the cutting mechanism to be repeatedly stopped and started with proper registration or synchronism of operation between the cutting mechanism and the printing unit.

Other advantageous uses of the described single position clutch structure will appear from time to time and those mentioned are intended merely to illustrate the utility of the structure.

In the described structure, the arcuate openings 38 and 39 serve to permit a limited amount of relative back lash movement between the driving and driven clutch members, the extent of such back lash movement being, however, limited by the travel of the pins 53 and 54 in the openings 38 and 39, respectively. It is considered desirable that such limited back lash movement be permitted in order to eliminate excessive strains especially in connection with the operation of heavy equipment such as printing equipment already referred to.

The gradually deepening grooves 40 and 41 constitute tracks for guiding the pins 53 and 54 gradually into the openings 38 and 39 to thereby avoid excessive snap action in the clutch structure, and also to insure entrance of the pins into the respective openings. In other words, the inclined ramp-like entrances to the openings 38 and 39 serve to prevent the pins 53 and 54 from overriding the openings 38 and 39 which might otherwise occur unless the openings themselves were lengthened sufficiently to provide adequate time for the pins to move into the openings. Such lengthening of the openings would, however, in many instances be objectionable in that it would permit excessive back lash movement which, in the described structure, is held to within desirable or permissible limits.

Changes in the described structure may be made without departing from the spirit of the invention, the scope of which should be determined by the following claims, the same being construed as broadly as possible, consistent with the state of the art.

I claim:

1. In a clutch, the combination of a pair of rotatable, coaxially disposed and relatively axially shiftable clutch members, said members having a plurality of circumferentially arranged, interengageable teeth for the transmission of rotary movement from one of the members to the other, said teeth having engaging faces substantially perpendicular to the plane of rotation of said members so as to afford positive driving connection between said members, and means for controlling axial movement of said members toward each other to cause said teeth to interengage only in a predetermined rotary relationship between said members, said means comprising an element projecting from one of said members toward the other in radially offset relation to said teeth, and said other member having an opening for receiving said projecting element only in said predetermined relationship of the members.

2. In a clutch, the combination of a pair of rotatable coaxially disposed and relatively axially shiftable clutch members, said members having a plurality of circumferentially arranged interengageable teeth for the transmission of rotary movement from one of the members to the other, means for controlling axial movement of said members toward each other to cause said teeth to interengage only in a predetermined rotary relationship between said members, said means comprising a pin projecting from one of said members toward the other, and said other member having an opening for receiving said pin in said predetermined relationship of the members, said other member having an arcuate groove coaxial with the member and communicating with said opening, the bottom of said groove being inclined from the normal surface of the member to a substantial depth at said opening and serving to permit relative axial movement of said clutch members so as to insure at least partial relative overlapping of said clutch teeth prior to actual interengagement therebetween, and movable means operatively connected to one of said clutch members for effecting axial shifting thereof relative to the other.

WILLIAM H. EDMONDSON.